United States Patent

[11] 3,568,713

[72] Inventors Werner G. Holzbock
 Bloomfield Hills;
 Wade R. Brown, Southfield, Mich.
[21] Appl. No. 742,674
[22] Filed July 5, 1968
[45] Patented Mar. 9, 1971
[73] Assignee Eaton Yale & Towne Inc.
 Cleveland, Ohio

[54] HYDRAULIC DRIVE CONTROL APPARATUS
 17 Claims, 8 Drawing Figs.
[52] U.S. Cl. .................................................. 137/596
[51] Int. Cl. .................................................. F16k 11/10
[50] Field of Search .......................................... 137/596+

[56] References Cited
 UNITED STATES PATENTS
 2,917,026  12/1959  Hall et al. ............... 137/596.15X
 3,234,957  2/1966  Allen ...................... 137/596.12X
 2,938,501  5/1960  Titcomb .................. 137/596.13X
 FOREIGN PATENTS
 548,175  9/1942  Great Britain ........... 137/596.2
 OTHER REFERENCES
 Electro-Hydraulic Actuator Moves in Micro-Steps Apr. 24,
 1967-Product Engineering pp. 36-38 Stepper Motors-Look Again
 Systems Designers Handbook July 1967, p. 89 I.B.M. Technical Bulletin Vol. 13, No. 7, Dec. 1960, pp. 3 & 4

*Primary Examiner*—Henry T. Klinksiek
*Attorney*—Teagno and Toddy

ABSTRACT: Disclosed herein is control apparatus for a hydraulic drive arrangement providing the drive arrangement with standby, intermittent, and continuous modes of operation. A fluid pressure source, hydraulic motor, and control apparatus for regulating fluid flow between the fluid source and the motor form the drive arrangement. The control apparatus includes a plurality of flow paths through the apparatus, a plurality of valves disposed in the flow paths with each valve having a plurality of operating positions, and structure for operating the valves to move the valves between the various operating positions to regulate fluid flow through the control apparatus. A mechanical feedback loop operable in response to a predetermined angular incremental advance of the motor controls the operating position of one of the valves whereby the motor may be utilized for the positioning of a driven member or load accurately and rapidly either in a series of predetermined increments or in a single continuous operation.

PATENTED MAR 9 1971

WERNER G. HOLZBOCK
WADE R. BROWN   INVENTORS.

BY *Fraques & Jordy*

ATTORNEYS

WERNER G. HOLZBOCK
WADE R. BROWN INVENTORS.

WERNER G. HOLZBOCK
WADE R BROWN   INVENTORS.

BY *Jeagers & Loudy*

ATTORNEYS

HYDRAULIC DRIVE CONTROL APPARATUS

BACKGROUND OF THE INVENTION

This invention relates to control apparatus for a hydraulic drive arrangement and more particularly to a hydraulic control system for rapidly moving and accurately positioning a driven member to a predetermined position within a predetermined time interval.

The need for rapid movement and accurate control of a workpiece or driven member of a paper drive machine in a computer readout device in given increments, or of a sewing or weaving machine, or of machine tools, such as a grinder, milling machine, lathe, drafter, drilling machine, or indexing table is well-known. Hydraulic drive arrangements comprising a reservoir, pump and motor, in conjunction with controls therefor, have been utilized in the past to provide fluid drives for such machines. In such arrangements it is necessary to rapidly accelerate the motor, measure the movement of the driven member or of the motor shaft in predetermined increments, and to rapidly decelerate the driven member in response to such measured movement while accurately positioning the driven member for the next operation. In order to accomplish this rapid acceleration and deceleration of the motor and to assure accurate positioning of the driven member or workpiece within small tolerance limits, it becomes necessary to minimize the effects of motor inertia when initiating or halting motor movement, and hence workpiece movement. This is accomplished generally by the use of valve means for interrupting fluid flow to or from the motor, the intermittent use of fluid bypass paths to isolate pressurized fluid flow from the motor, and the use of mechanical means for releasing and locking or interrupting motor rotation.

Many systems use combinations of the above to overcome the motor inertia problem. Mechanical clutch and brake arrangements, latches and detents have long been used to rapidly decelerate a fluid drive once flow to the motor of such drive has been interrupted hydraulically by appropriate valuing. The disadvantages associated with such relates to speed and cost, that is, to the response time of the system in positioning the workpiece and placing itself in a state of readiness for the next incremental movement, and to the cost of providing mechanical assists to assure rapid and accurate positioning of the workpiece.

SUMMARY OF THE INVENTION

It is the primary object of the present invention to provide improved control apparatus for rapidly initiating motor rotation, advancing a driven member to a predetermined position, and rapidly halting motor rotation by simultaneously controlling flow to and from the motor, wherein the control apparatus is especially adapted for use with hydraulic drive arrangements for high speed, precision business machines, paper printers, sewing machines, machine tools and the like.

Another object of this invention is to provide hydraulic drive control apparatus of simple construction having a standby, an intermittent, and a continuous mode of operation wherein the selection of these various modes may be externally programmed and actuated.

It is a further object of this invention to provide control apparatus for a hydraulic drive system comprising a plurality of valve means, each having a plurality of operating positions, interconnecting flow paths between the valve means for connecting the fluid source and motor to the control means, and feedback means operable in response to a predetermined amount of motor shaft rotation to vary the operating position of one of the valve means whereby the drive system may be utilized for the positioning of a driven member, accurately and rapidly, either in a series of predetermined increments or in a single continuous operation.

It is another object of this invention to provide improved hydraulic drive control apparatus capable of rapidly performing a series of operations, wherein fluid flow to and from the hydraulic motor is simultaneously initiated or interrupted when starting or halting, respectively, rotation of the motor in order to minimize the effects of motor inertia, thereby reducing apparatus and motor response time between successive operations.

It is a further object of this invention to provide improved hydraulic drive control apparatus which is readily adaptable to perform either in a low accuracy, high speed environment or in a high precision, high speed environment such as a machine tool numerical control and drive system with minimum modification.

Other objects and important features of the present invention will be apparent from a study of the specification following taken with the drawing, which together show, illustrate, describe and disclose several embodiments or modifications of the invention, and what is now considered to be the best modes of practicing the principles thereof. Other embodiments or modifications may be suggested to those having the benefits of the teachings herein, and such other embodiments or modifications are intended to be reserved especially as they fall within the scope and spirit of the subjoined claims.

DESCRIPTION OF A FIRST EMBODIMENT

Figure 1:
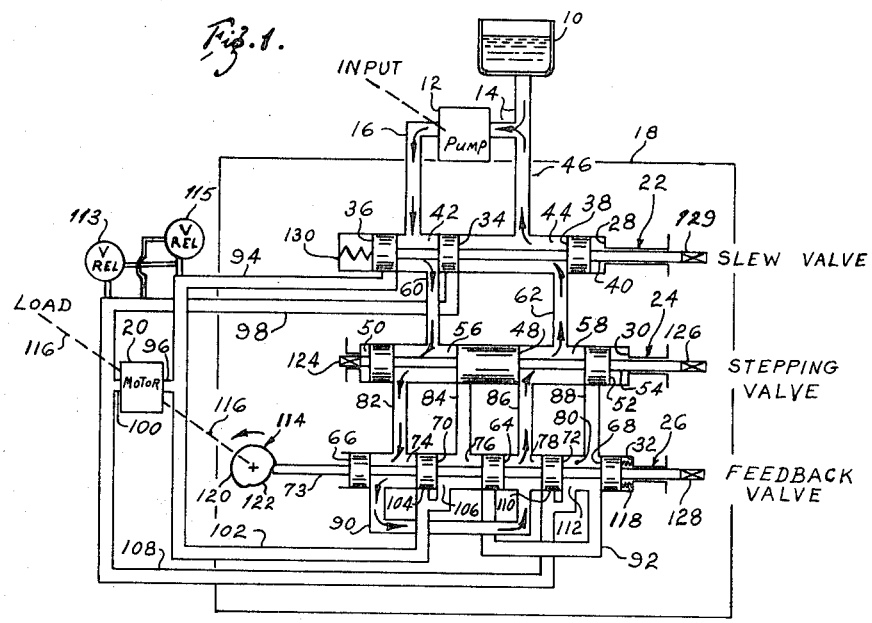
FIG. 1 is a diagrammatic view of a first embodiment showing control apparatus for regulating fluid flow therethrough placed for purposes of illustration within a hydraulic circuit having a fluid pump and a fluid motor, the plurality of means for regulating fluid flow through such apparatus being positioned for establishing a motor bypass fluid flow path wherein the pressurized output of the pump is not in communication with the fluid motor.

Referring now to the drawing, and particularly to FIG. 1, wherein the invention is shown as control apparatus for a hydraulic drive arrangement, providing for both intermittent and continuous modes of operation thereof with the response time of the drive arrangement to external start and stop command signals being very rapid and response delays due to motor inertia being minimal. The arrangement comprises a fluid source 10 in communication with a positive displacement pump 12 through an inlet conduit 14. The pump 12 discharges a pressurized fluid output through conduit means 16 into control apparatus 18 for initiating the simultaneous starting and stopping of fluid motor 20.

The control apparatus 18 comprises a plurality of flow paths disposed in series relationship relative to each other and means 22, 24, and 26 for controlling fluid flow through the flow paths. Means 22, 24 and 26 comprise elements movable by structure, to be disclosed herein, between a plurality of operating positions to define several operating modes in conjunction with the plurality of flow paths. Hereinafter, means 24 will be referred to as the first element 24; means 26 will be referred to as the second element 26, and means 22 will be referred to as the third element 22.

For purposes of illustration, the elements 22, 24 and 26 will be shown in the drawing preferably as spool valves. With reference to FIG. 1, the apparatus 18 comprises the three spool valves 22, 24, and 26 inserted within three parallel cylindrical bores 28, 30, and 32, a plurality of conduit means interconnected with the valves to form the plurality of flow paths which will be described in detail hereinafter. The reservoir 10, pump 12, and motor 20, and conduit means interconnecting same to the apparatus 18 are all shown external of the apparatus 18, though it is appreciated that all or any of these items may be located internally within the apparatus 18 without affecting the operation thereof.

The third element valve 22, hereinafter referred to as the slew valve, is a reciprocable spool valve comprising a center land 34 disposed between spaced end lands 36 and 38, respectively, fixedly mounted upon a central and common shaft 40. When the valve 22 is inserted and disposed within the cylindrical bore 28 of the housing member 18, the above described valve structure in conjunction with the inner wall of the bore defines a pair of spaced, annular, and slidable chambers 42 and 44 between the lands 34 and 36 and the lands 34 and 38, respectively. For purposes of illustration structure effective to move the valve 22 between the various operating positions is shown herein preferably as a solenoid 129 and a return spring 130.

Conduit 16 places the pump discharge in communication with the chamber 42 at all times, while the conduit 46 places chamber 44 in communication with the reservoir 10 and the inlet side of the pump 12 through the conduit 14 at all times.

The first element, i.e., the valve 24, hereinafter referred to as the stepping valve, in a reciprocable spool valve which likewise comprises a center land 48 disposed between spaced end lands 50 and 52, respectively, fixedly mounted upon a central and common shaft 54. When the valve 24 is inserted and disposed within the bore 30 of the housing member 18, the above described valve structure and inner wall of the bore 30 defines a pair of spaced, annular, and slidable chambers 56 and 58 between the lands 48 and 50 and the lands 48 and 52, respectively. For purposes of illustration, structure effective to move the valve 24 between the various operating positions is shown herein as preferably a pair of solenoids 124 and 126.

Figure 5:
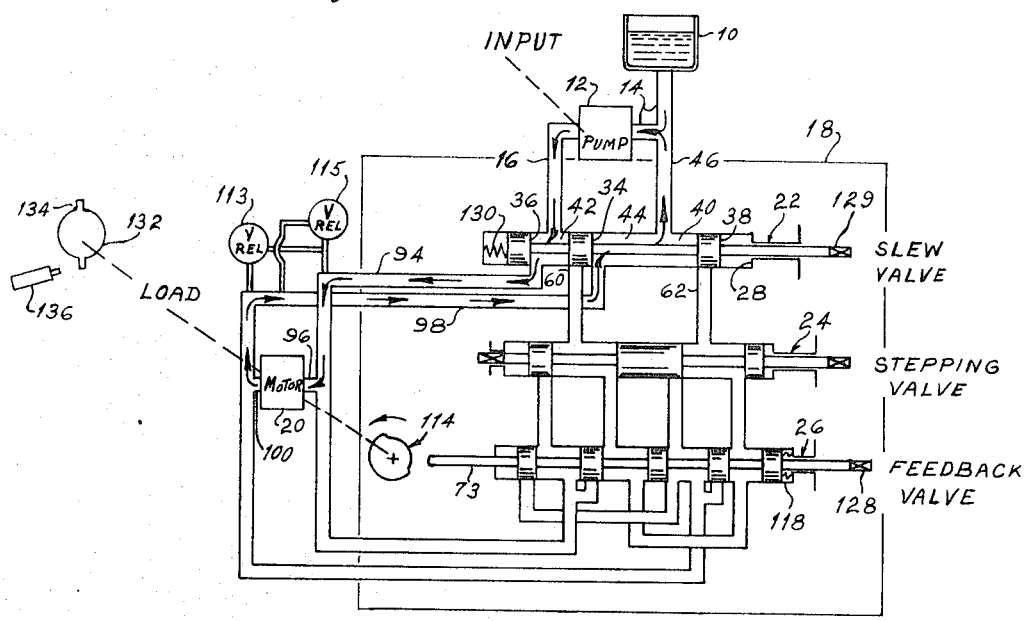
FIG. 5 is a diagrammatic view of the first embodiment within the hydraulic circuit, the plurality of means for regulating flow through such control apparatus being positioned for establishing a third set of separate and independent flow paths therethrough and placing the fluid motor in communication with the pressurized output of the pump.

Conduit 60 normally places the chamber 42 of the slew valve 22 in communication with the chamber 56 of the stepping valve 24. Similarly the conduit 62 normally places the chamber 44 of the slew valve 22 in communication with the chamber 58 of the stepping valve 24. As best seen in FIG. 5, the lands 34 and 38 of the valve 22 may be moved to close the openings of the conduits 60 and 62 into the chambers 42 and 44, respectively, to isolate the chamber 42 from fluid communication with the chamber 56 and the chamber 44 from fluid communication with the chamber 58. This valve movement and its effect will be described in further detail hereinafter.

The second element, i.e., the valve 26, hereinafter referred to as the feedback valve, is also illustrated as a reciprocable spool valve. The valve 26 comprises a center land 64 disposed between spaced end lands 66 and 68, and a pair of spaced intermediate lands 70 and 72 wherein the land 70 is disposed between the center land 64 and the end land 66 and land 72 is disposed between center land 64 and end land 68 and wherein each of the lands is fixedly mounted upon a central and common shaft 73. When the valve 26 is inserted and disposed within the bore 32 of the housing member 18, the above described feedback valve 26 and inner wall of the bore defines four spaced, annular and slidable chambers 74, 76, 78 and 80 formed between the lands 66 and 70, lands 70 and 64, lands 64 and 72, lands 72 and 68, respectively. For purposes of illustration, structure to move valve 26 between the various operating positions is shown herein preferably as member 114 and return spring 118.

Figure 2:
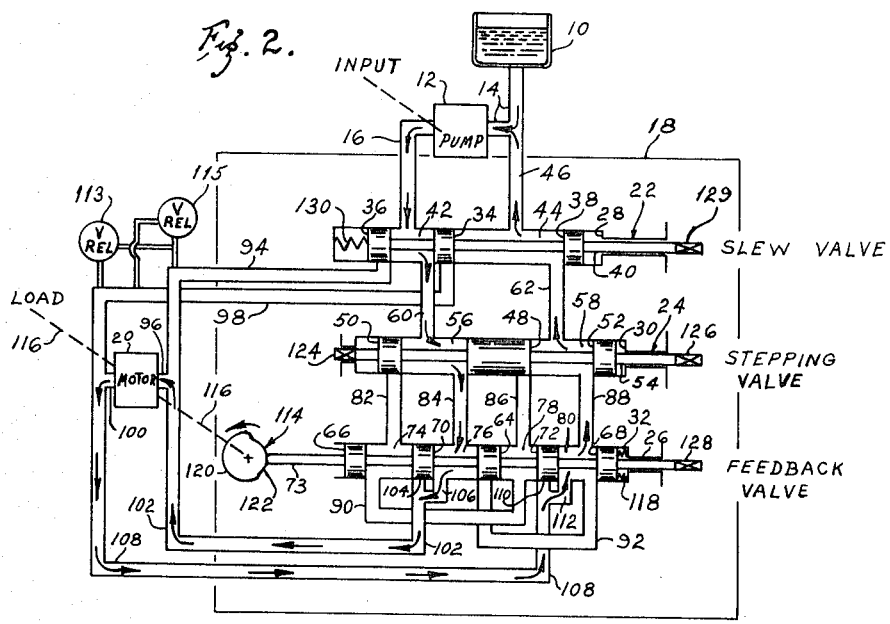
FIG. 2 is a diagrammatic view of the first embodiment within the hydraulic circuit, the plurality of means for regulating fluid flow through such control apparatus being positioned for establishing a first set of separate and independent flow paths therethrough and placing the fluid motor in communication with the pressurized output of the fluid pump.
Figure 3:
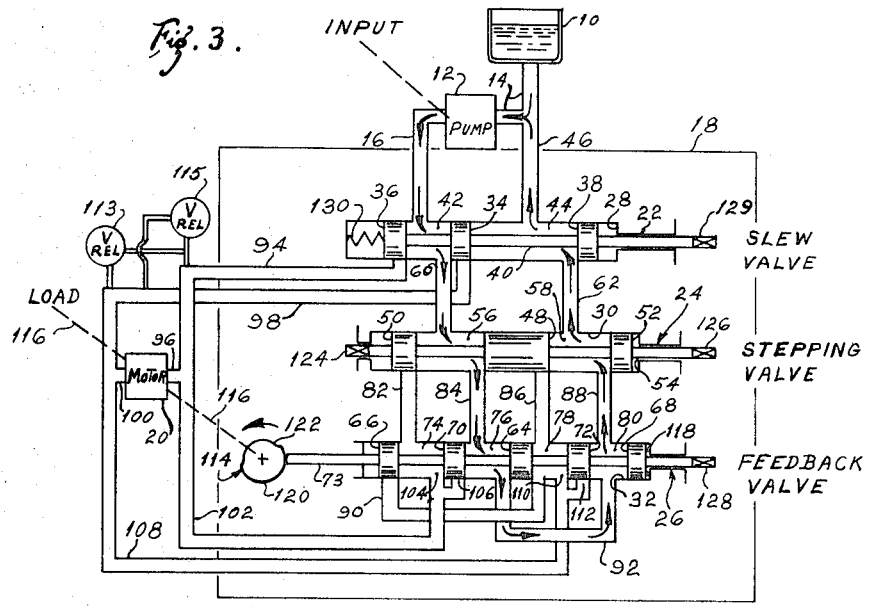
FIG. 3 is a diagrammatic view of the first embodiment within the hydraulic circuit, the plurality of means for regulating fluid flow through such control apparatus being positioned for establishing a motor bypass fluid flow path wherein the pressurized output of the pump is not in communication with the fluid motor.
Figure 4:
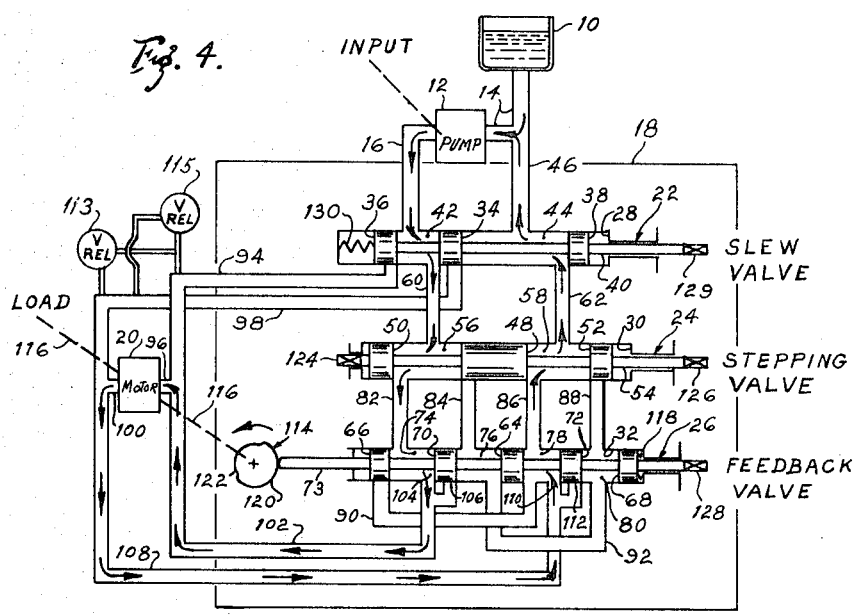
FIG. 4 is a diagrammatic view of the first embodiment within the hydraulic circuit, the plurality of means for regulating flow through such control apparatus being positioned for establishing a second set of separate and independent flow paths therethrough and placing the fluid motor in communication with the pressurized output of the fluid pump.

A plurality of fluid conduits 82, 84, 86 and 88 place the fluid chambers 74, 76, 78 and 80 of the feedback valve 26 in communication with portions of the stepping valve 24. As will become apparent as the various valve operating positions are disclosed hereinafter, the fluid chamber 56 of the stepping valve 24 is at all times in fluid communication with either the fluid chamber 74 of the feedback valve 26 through the conduit 82 (as seen in FIGS. 1 and 4) or with the fluid chamber 76 of the feedback valve 26 through the conduit 84 (as seen in FIGS. 2 and 3). Similarly the fluid chamber 58 of the stepping valve 24 is at all times in fluid communication with either the fluid chamber 78 of the feedback valve 26 through the conduit 86 (as seen in FIGS. 1 and 4) or with the fluid chamber 80 of the feedback valve 26 through the conduit 88.

Conduits 90 and 92 are provided to place alternate fluid chambers of the feedback valve 26 in series fluid communication. Movement of the feedback valve 26 to the various operating modes of the system intermittently interrupts one or the other of these series paths. More particularly, as seen in FIGS. 1 and 2 the conduit 90 places the fluid chambers 74 and 78 in fluid series relationship; and as seen in FIGS. 3 and 4, a movement of the feedback valve 26 to the right will interrupt this series connection by sliding the fluid chamber 74 to the right until land 66 closes the adjacent opening of the conduit 90 into the bore 32. Similarly the conduit 92, as seen in FIGS. 3 and 4, places the fluid chambers 76 and 80 in a fluid series relationship which may be interrupted intermittently by a movement of the feedback valve 26 to the left wherein the slidable fluid chamber 76 is moved to the left until the land 64 closes the adjacent opening of the conduit 92 into the bore 32.

The function of the above described conduits 90 and 92 is to form part of a first or a second bypass path, respectively, wherein fluid may neither flow from the pump 12 to the motor 20 nor from the motor 20 to the pump 12. As will become apparent, fluid flow bypasses motor 40 when fluid flows uninterrupted through either the conduit 90 or the conduit 92, and as will be explained in detail, movement of any of the three valves 22, 24, and 26 is capable of interrupting fluid flow through either of the conduits 90 or 92.

An additional fluid flow path is provided to place the pump output passing through the slew valve 22 in intermittent fluid communication with the motor 20. More particularly, as seen in FIG. 5, the conduit 94 places the fluid chamber 42 of the slew valve 22 in communication with the inlet port 96 of the motor 20. Similarly, the conduit 98 places the fluid chamber 44 in communication with the exhaust port 100 of the motor 20. It is noted at this time that the lands 34 and 38 of the slew valve 22 close the openings of the conduits 60 and 62, respectively, into the bore 28 thereby hydraulically isolating the stepping valve 24 and the feedback valve 26 from the pump 12 and the motor 20.

As seen in FIG. 1, movement of the slew valve 22 to the right from the position shown in FIG. 5 to that shown in FIG. 1 results in moving the lands 36 and 34 to the right to close the openings of the conduits 94 and 98, respectively, into the bore 28 thereby interrupting simultaneously fluid flow to and from the motor 20 through the conduits 94 and 98, respectively. This movement of the valve 22 also restores fluid communication between the pump 12 and the stepping and feedback valves 24 and 26 through the slew valve 22 by shifting the lands 34 and 38 to uncover the openings of the conduits 60 and 62, respectively, into the bore 28.

Fluid flow paths are provided also to place the feedback valve 26 in fluid communication with the motor 20. More particularly, the conduit 102 which has multiple openings 104 and 106 into the bore 32 places the inlet port 96 of the motor 20 in communication with either the fluid chambers 74 or 76 of the feedback valve 26 depending upon the positioning of the land 70 of the valve 26 relative to the openings 104 and 106. Similarly, the conduit 108 which has multiple openings 110 and 112 into the bore 32 places the exhaust port 100 of the motor 20 in communication with the fluid chambers 78 or 80 of the feedback valve 26 depending upon the positioning of the land 72 of the valve 26 relative to the openings 110 and 112.

Relief valves 113 and 115 of conventional form are provided in both the inlet and exhaust portions of the motor circuitry.

The motor 20 comprises an output shaft 116 adapted to drive a load and a member 114 which is coupled to the shaft 116 so as to rotate in phase with the shaft. The member 114 illustrated herein is a cam mounted upon and driven by the shaft 116 of the motor 20. The cam 114 is positioned in abutting contact with the shaft 73 of the spool valve 26. Rotation of the cam 114 by the motor 20 through the shaft 116 results in producing a reciprocating movement of the valve 26. As the lobes or high portions 120 of the cam 114 are brought into contact with the shaft 73, the spool valve 26 moves from the position shown in FIGS. 1 and 2 to the right to the position illustrated in FIGS. 3 and 4 wherein the valve return spring 118 is compressed. Further rotation of the cam 114 beyond the region where the lobe portion 120 bears upon the shaft 73 brings the base circle or the low portion 122 of the cam 114 into contact with the shaft 73 at which time the shaft 73 under the urging of the expanding return spring 118 moves to the left.

As is apparent, a cam member having a plurality of lobe (high) and base circle (low) areas could be utilized in place of the above described cam, the exact number of high and low areas being dependent upon the degree of incremental control over the driven load desired per motor shaft revolution. It is also clear that appropriate gearing disposed between the motor 20 and the cam 114 could be utilized to regulate rotation of the load relative to the cam 114. In addition, a rotary valve or the like could be substituted for the cam 114 and the spool valve 26 and driven in phase with the motor to provide the feedback loop. In this instance the rotary valve in replacing the spool valve 26 would perform all valving functions in addition to performing the feedback function.

OPERATION

Each of the three valves 22, 24, and 26 has at least two operating positions which will be described in detail as the various operating modes of the apparatus are considered. These modes of operation are:

1. a standby mode utilizing either a first or second motor bypass path 90 and 92, respectively, as seen in FIGS. 1 and 3, wherein there is neither fluid flow from the pump 12 to the motor 20 nor from the motor 20 to the pump 12;
2. a stepping mode as seen in either FIG. 2 or 4 wherein fluid flow to and from the motor 20 passes through either a first set or second set of separate and independent flow paths and through each of the three valves 22, 24 and 26, and
3. a slew or continuous mode wherein fluid flow to and from the motor 20 is directed through the slew valve 22 through a third set of separate and independent flow paths, while the stepping and feedback valves 24 and 26, respectively, and the first and second sets of flow paths 90 and 92 are bypassed.

Hereinafter the slew valve 22 will be said to be in a first operating position as seen in FIGS. 1 through 4 when the solenoid 129 is deenergized and in a second operating position as seen in FIG. 5 when the solenoid 129 is energized. The stepping valve 24 will be said to be in a first operating position as seen in FIGS. 1 and 4 when solenoid 124 is energized and the solenoid 126 is deenergized, and in a second operating position as seen in FIGS. 2 and 3 when the solenoid 124 is deenergized and the solenoid 126 is energized. The feedback valve 26 will be said to be in a first operating position as seen in FIGS. 1 and 2 when the base circle portion 122 of the cam 114 is bearing upon the shaft 73 of the spool valve 26, and in a second operating position as seen in FIGS. 3 and 4 when the raised or high portion 120 of the cam 114 is bearing upon the shaft 73.

With particular reference to FIG. 1, assuming the pump 12 is being driven by some appropriate power input and is discharging fluid under pressure into the conduit 16, the system is shown in the first standby or bypass mode of operation at which time the solenoid 124 of the stepping valve 24 is energized and the base circle portion 120 of the cam 114 is bearing upon the shaft 17 of the spool valve 26. All other solenoids are deenergized at this time. Thus each of the valves 22, 24 and 26 are in the first operating position and are positioned to isolate hydraulically the motor 20 from the pressurized output of the pump 12.

Within the bore 28 during the interval the system is in the first bypass mode of operation, as seen in FIG. 1, the lands 34 and 36 of the valve 22 are positioned to close the openings of the conduits 98 and 94, respectively, into the bore 28 thereby preventing fluid flow from the pump through the conduit 16 and the chamber 42 of the valve 22 into the conduit 94 and on to the motor 20, and from the motor 20 through the conduit 98 into the chamber 44 and on to the pump 12 through the conduit 46. Similarly, the positioning of the various lands of the stepping and feedback valves 24 and 26 prevents fluid flow to and from the motor 20 through the remaining two conduits 102 and 108 in communication with said motor 20. More particularly, within the stepping valve 24, the lands 48 and 52 are seated upon the openings to the conduits 84 and 88, respectively, into the bore 30; and within the feedback valve 26 lands 70 and 72 are seated upon the openings 104 and 112 of the conduits 102 and 108, respectively, into the bore 32. These lands 48, 52, 70 and 72 thus function at this time to hydraulically isolate the conduits 102 and 108 from the pump 12.

All the remaining conduit openings into the various valve bores are open at this time. Thus the following closed loop first bypass path is established wherein the pressurized discharge of the pump 12 into the conduit 16 is routed through the chamber 42 of the slew valve 22, conduit 60, the chamber 56 of the stepping valve 24, conduit 82, chamber 74 of the feedback valve 26, into the first bypass conduit 90, through the chamber 78 of the feedback valve 26, conduit 86, chamber 58 of the stepping valve 24, conduit 62, chamber 44 of the slew valve 22, and on through the conduits 46 and 14 back to the pump 12. Consequently, in the standby mode of operation, the motor 20 is hydraulically locked, fluid neither flowing to or from the motor 20, and the driven load is held stationary.

With particular attention to FIG. 2, to switch from the standby mode to the stepping mode of operation, the solenoid 126 of the stepping valve 24 is energized while the solenoid 124 is deenergized, thus the stepping valve 24 moves to the right assuming the second operating position. All other valves remain in the first operating position as described in conjunction with FIG. 1. The switching operating changing the state of the solenoids may be accomplished manually, though preferably this would be accomplished automatically in response to an external program such as might be found in a computer where the present invention could be utilized to incrementally control and drive a readout device such as a printer, or such as might be found in a machine tool where the present invention would be utilized to position incrementally a workpiece relative to the tool, or a tool relative to a stationary workpiece.

With the stepping valve 24 moving from the first to the second operating position, the spool valve moves to the right, lands 50 and 48 of valve 24 moving to close the openings of conduits 82 and 84, respectively, into the bore 30. This has the effect of interrupting the aforementioned first bypass path. Simultaneously the lands 48 and 52 of value 24 are shifted to the right uncovering the openings of conduits 84 and 88, respectively, into the bore 30 thereby establishing a first set of separate and independent flow paths, a first path which places the pressurized fluid output of the pump 12 in communication with the motor 20 through the conduit 102 and a second path which established an exhaust flow path from the motor 20 through conduit 108 to the reservoir 10 and the pump 12.

More particularly, the first set of flow paths is as follows. A fluid flow path is established from the pump 12 to the motor 20 through the conduit 16, chamber 42 of the slew valve 22, conduit 60, chamber 56 of the stepping valve 24, conduit 84, chamber 76 of the feedback valve 26 into the opening 106 of the conduit 102, on through the conduit 102 into the inlet port 96 of the motor 20. A return flow path from the motor 20 to the pump 12 is established through the exhaust port 100 of the motor 20, conduit 108, into chamber 80 of the feedback valve 26, conduit 88, chamber 58 of the stepping valve 24, conduit 62, chamber 44 of the slew valve 22, and conduit 46 into conduit 14 which is in fluid communication with both the reservoir 10 and inlet side of the pump 12.

With the motor 20 in fluid communication with the pressurized output of the pump 12, the motor 20 begins to rotate causing both the load and the cam 114 to rotate in a counterclockwise direction. With the base circle portion 122 of the cam 114 in abutting engagement with shaft 73 of the feedback spool valve 26, s as seen in FIG. 1, and with rotation being in the counterclockwise direction, the cam 114 will rotate to and beyond the position shown in FIG. 2 without effecting a change in the operating position of the feedback valve 26. However, as the cam 114 further rotates bringing the raised lobe portion 120 of the cam into abutting contact with the shaft 73 (as seen in FIG. 3), the spool valve 26 will be caused to move to the right compressing the return spring 118 of the valve 26 at which time the feedback valve 26 will be shifted to the second operating position. The rise on the cam surface leading from a low portion area into the high portion area gradually compresses the return spring through the abutting shaft 73 thereby gradually closing openings 106 and 112 into the bore 32 of the valve 26 and gradually decreasing motor velocity, thereby minimizing the effects of motor inertia.

The effect of the feedback valve 26 being shifted to the second operating position is twofold. First, fluid flow through the feedback valve through the first set of flow paths to and from them motor 20 is interrupted. As lands 70 and 72 of valve 26 move to the right, the lands close the openings 106 and 112 into the conduits 102 and 108, respectively, thereby hydraulically isolating both sides of the motor from the balance of the system. Consequently the motor 20 is instantaneously and hydraulically locked in position and ceases to rotatively drive the load and the cam 114. Thus the load has been advanced the predetermined increment or step, in this instance 180°. It is clear that the size of the increment or step in terms of degrees of rotation of the load is a function of cam design and that this increment may be varied by merely designing a predetermined number of spaced raised portions on the cam race, the angle between successive raised portions of the cam determining the. amount of rotation per step. As both conduits to and from the motor are simultaneously opened or closed to either start or halt motor rotation, respectively, motor inertia and hence response time is minimal. Thus it is possible with the present invention to advance the load rapidly and accurately in very small increments of only a few degrees of rotation and to then abruptly halt said advance.

The second effect of the movement of the feedback valve 26 at this time is to place the system in the standby mode of operation by establishing a second fluid bypass path. As land 64 of the valve 26 shifts to the right the opening of the bypass conduit 92 into the bore 32 is uncovered and the conduit 92 is placed in communication with the fluid chamber 76. Thus with land 70 of the valve 26, as earlier described, preventing fluid flow from the chamber 76 into the conduit 102, flow from the conduit 84 into the chamber 76 of the feedback valve 26 is redirected through the bypass conduit 92 into the chamber 80 of the feedback valve 26, and through the conduit 88, fluid chamber 58 of the stepping valve 24, conduit 62, fluid chamber 44 of the slew valve 22, conduits 46 and 14 to the pump 12. Consequently the second bypass path is established.

Should a second step be required or had the original external program called for a second step, at this time and simultaneously, the solenoid 126 of the stepping valve 24 is deenergized while the solenoid 124, also of the stepping valve 24, is energized. This effects a change of the system from the standby mode to the stepping mode by moving the stepping valve 24 from the second operating position to the first operating position, as seen in FIG. 4, shifting spool valve 24 to the left under the influence of solenoid 124, while valve 22 remains at the first operating position and valve 26 at the second operating position.

The effect of this movement of the stepping valve 24 is twofold. First, the lands 48 and 52 of the valve 24 are shifted to the left closing the openings of the conduits 84 and 88, respectively, into the bore 30, thereby interrupting flow through the second bypass path through the conduit 92 as earlier described. Secondly, the lands 48 and 50 of the valve 24 in moving to the left uncover the openings of the conduits 86 and 82, respectively, into the bore 30. Consequently the conduits 102 and 108 leading to and from the motor 20 are again placed in communication with the pump 12 to energize the motor 20 through a second set of separate and independent flow paths. The fluid flow path established from the pump 12 to the motor 20 is through the conduit 16, chamber 42 of the slew valve 22, conduit 60, chamber 56 of the stepping valve 24, conduit 82, chamber 74 of the feedback valve 26, conduit 102 into the inlet port 96 of the motor 20. The return path from the motor 20 to the pump 12 is from the exhaust port 100 of motor 20 through conduit 108 into chamber 78 of the feedback valve 26, conduit 86, chamber 58 of the stepping valve 24, conduit 62, chamber 44 of the slew valve 22, conduit 46 into conduit 14 and back to the pump 12.

With the motor 20 again in communication with the pump 12, as seen in FIG. 4, the motor 20 begins to rotate further advancing the load and cam 114 in a counterclockwise direction. The rotational movement of the load and cam 114 continues until rotation of the cam 114 moves the shaft 73 of the feedback spool valve 26 out of contact with the raised portion 120 of the cam 114. At this time the spool valve 26 under the urging of return spring 118, in order to maintain shaft 73 in abutting engagement with the base circle portion 122 of the cam 114, moves to the left, as now seen in FIG. 1. Consequently lands 70 and 72 of the feedback valve 26 shifts to the left closing the openings 104 and 110 of conduits 102 and 108 into the bore 32, respectively, thereby preventing further fluid flow to and from the motor 20 and halting further rotational movement of both the load and cam member 114, and thus completing the step or incremental movement. Simultaneously, the leftward movement of the feedback value 26 uncovers the land 66 of the valve 26 from the opening of the conduit 90 into the bore 32 thereby again establishing the first bypass path and placing the system in the standby mode of operation.

From the above description of the system it may be concluded that where intermittent operation of the system is desired, each step or angular incremental movement of the load requires:

1. that the slew solenoid 64 be deenergized at all times during said incremental movements;
2. energization of whichever of the two solenoids 124 and 126 of the stepping valve 24 was deenergized prior to initiation of the step command (as one or the other of the solenoids is always energized), to initiate fluid communication through either the first or second set of flow paths between the pump 12 and motor 20 and to interrupt the active bypass path;
3. Simultaneously with 2 above, deenergization of the other stepping solenoid;
4. a movement of the feedback valve 26 in response to the predetermined shape of the rotating cam 114 indicating the completion of the desired incremental angular movement of the load to interrupt fluid flow to and from the motor 20 while establishing a bypass path and placing the system in the standby mode of operation.

One mode of operation remains to be considered, i.e. the slew or continuous mode of operation. In the slew mode a signal from the external program energizes the solenoid 129 of the slew valve 22, shifting the valve 22 to the left from the first operating position, as seen in FIGS. 1 through 4, to a second operating position as seen in FIG. 5. The effect of such movement of the slew valve is twofold. First, the lands 36 and 34 of the slew valve 22 in shifting to the left are moved off the openings of the conduits 94 and 98, respectively, into the bore 28 thereby placing the motor 20 in fluid communication with pump 12 through a third set of separate and independent flow paths. The flow path to the motor 20 is from the pump 12 through the conduit 16, chamber 42 of the slew valve 22, conduit 94 to the inlet port 96 of the motor. The return path is from the exhaust port 100 of the motor 20, through conduit 98, fluid chamber 44 of the slew valve, conduits 46 and 14 into the pump 12.

Secondly, in assuming the second operation position, the slew valve 22 places the lands 34 and 38 upon the openings of conduits 60 and 62, respectively, into the bore 28, thereby hydraulically isolating the stepping valve 24 and the feedback valve 26 from the slew valve 22 and the motor 20. Consequently, though the feedback valve 26 under the influence of cam member 114 is being reciprocated between the two operating positions as the motor shaft 116 rotates, said movements of the feedback valve 26 have no effect upon the pump output being delivered to the motor 20 through the slew valve 22.

Where desired in order to reduce the continuous wear upon the cam surfaces during the slew mode of operation a solenoid 128 may be added to the feedback valve 26 to control the positioning of the feedback valve 26, and hence of shaft 73, during the slew mode of operation. As seen in FIG. 5 wherein the feedback valve 26 is shown positioned upon energization of solenoid 128, the valve 26 and the shaft 73 have been shifted to the right whereas shaft 73 is fully disengaged from the rotating cam 114. The same signal that initiates energization of the slew valve solenoid 64 to place the system in the slew mode of operation may be utilized to initiate simultaneous energization of the solenoid 128. The solenoid 128 also may be energized when the cam 114 is being routinely checked during maintenance or when it is desired to replace a cam 114 to effect a change in the step timing, the movement of shaft 73 of the valve 26 compressing spring 118 of the valve 26 thereby unloading the cam surface of the spring force for maintenance or replacement accessibility.

Upon completion of the slew mode of operation, solenoids 128 and 129 are deenergized. The slew valve 22 under the influence of the return spring 130 shifts to the right from the second operating position to the first operating position as seen in FIG. 1. Lands 34 and 36 of the valve 22 are seated upon the openings of conduits 98 and 94 into the bore 28, respectively, preventing further fluid flow to and from the motor 20. Simultaneously lands 34 and 38 of the valve 22 are shifted off the openings of conduits 60 and 62 into the bore 28 establishing communication between the slew valve 22 and stepping valve 24. The feedback valve 26 during this time interval, under the influence of the return spring 118, is urged to the left until the shaft 73 is again in abutting engagement with the cam 114, a said movement of the feedback valve 26 establishing fluid flow through one or the other of the two bypass conduits 90 and 92. Thus the system is placed in the standby mode of operation.

Means 132 for counting or sensing the number of steps during the slew operation is provided. Means 132 may comprise a magnetic pickup device 132 or a photocell and light source unit, or the like. In the former which is illustrated in FIG. 5 a gear wheel 136 is attached to and driven by the motor shaft, the number of teeth corresponding to the number of steps developed by the system per revolution of the motor shaft. The irregularities in the gear wheel circumference interrupts a magnetic field established by the pickup which comprises in part a permanent magnet and which is positioned in close proximity to the gear wheel circumference. The changing flux field produces a voltage pulse, the number of pulses corresponding to the number of interruptions of the field by the rotating gear wheel. Thus the passage of each gear tooth before the pickup device corresponds to a single step or incremental advance of the load, and results in the production of a voltage pulse. Consequently by counting the pulses developed by the magnetic pickup device 134 it is possible to continually count the number of steps taken by the system during the slew mode of operation so that the load positioning is continually monitored.

It is apparent from the foregoing that where it is desired to provide a control for a hydraulic drive system capable of providing intermittent or stepped motion, the present invention is readily modified to provide said limited capability. In this instance, the slew valve 22 and counting means 132 are omitted from the first embodiment and the conduits 16 and 46 are placed in direct communication with the fluid chambers 56 and 58 of the stepping valve 24. Operation will be as earlier described in conjunction with FIGS. 1 through 4. This modification is readily possible as the slew valve remains in the first operating position at all times when the system is in either a standby or stepping mode of operation, effecting a change to the second operating position only when the system is to be placed in the continuous or slew mode of operation. Thus if the system is programmed to utilize only its stepping capabilities, there is no need to provide a slew valve 22 as part of the system, and said valve may be removed from the system. Similarly conduits 94 and 98 placing the slew valve 22 in communication with the motor 20 during the slew mode of operation are no longer required and need not be provided. Consequently where it is desired to provide only the stepping capability the control system is modified to be comprised of only the stepping valve and feedback valve, interconnecting conduits, and conduits placing the pump in communication with the stepping valve and placing the feedback valve in communication with the motor.

A SECOND EMBODIMENT

Figure 6:
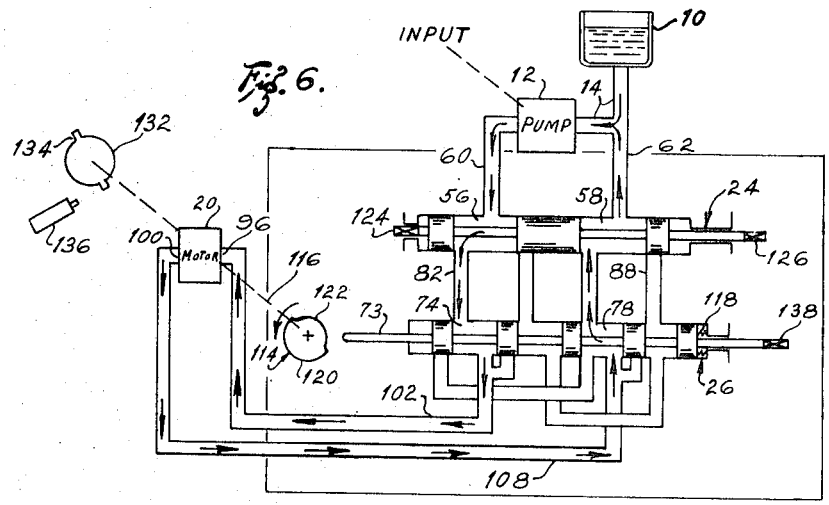
FIG. 6 is a diagrammatic view of a second embodiment showing control apparatus for regulating fluid flow therethrough placed for illustration within a hydraulic circuit having a fluid pump and a fluid motor, wherein the first embodiment has been modified, the modification consisting of a reduction of the means for regulating flow through such apparatus, without loss of any of the operational capabilities of such apparatus.

With particular attention to FIG. 6, a second embodiment of the present invention utilizing only first and second elements as the means for controlling fluid flow through the control apparatus is illustrated. The three operating modes are retained.

The second embodiment comprises a first and a second element herein illustrated as the stepping valve 24 and the feedback valve 26, respectively. The valves 24 and 26 are in all respects identical to the valves illustrated in FIGS. 1 through 5. Interconnecting conduits forming the fluid flow paths between the valve 24 and the valve 26 and the motor 20 are also identical to the interconnecting conduits similarly disposed and illustrated in FIGS. 1 through 5. Consequently, to this extend, similar reference numerals are utilized to denote like portions of the control apparatus.

The structure for operating the valve 24 between its plurality of positions is again illustrated as the solenoids 124 and 126. The structure for operating the valve 26 between the plurality of positions is illustrated as the member 114 rotatively driven by the motor 20, and the return spring 118. In addition, structure, illustrated herein preferably as the solenoid 138, is supplied to provide the valve 26 with the capability of being moved to at least one additional operating position.

With reference to the first embodiment disclosed in FIGS. 1 through 5, the second embodiment of FIG. 6 differs in that the valve 22, conduits 46, 60, 94 and 98 have been deleted. The fluid discharge of the pump 12 is routed through the conduit 16 directly to the fluid chamber 56 of the valve 24. Return flow from the apparatus is from the fluid chamber 58 of the valve 24 directly through the conduits 62 and 14 to the pump 12.

As was earlier noted with respect to the initial embodiment of FIGS. 1 through 5, the stepping and bypass modes of operation were performed while the slew valve 22 was maintained in the first position, that is, the stepping and the bypass modes of operation were achieved by moving the stepping valve 24 and the feedback valve 26 between the plurality of operating positions. Consequently it will be appreciated that the second embodiment is capable of performing the stepping and bypass functions in the same manner that these functions were performed by the initial embodiment. Thus the description of the operation of the alternate or second embodiment will be limited to a description of how the slew mode of operation is performed by the second embodiment.

As earlier indicated, the valve 26 is provided with the capability of being movable to at least one additional operating position. The valve 26 has a first operating position whereat the shaft 73 of the valve 26 is in abutting engagement with a low portion 122 of the member 114 and the return spring 118 is extended; a second operating position whereat the shaft 73 is in abutting engagement with a high portion 120 of the member 114 and the return spring 118 has been compressed. Structure illustrated herein as solenoid 138 is provided to move the valve 26 to a third operating position. At the third operating position, illustrated by FIG. 6 the shaft 73 of the valve 26 has been taken out of abutting engagement with member 114 and the return spring 118 has been compressed.

The second embodiment is placed in the slew mode of operation by energizing simultaneously solenoid 126 of the valve 24 and solenoid 138 of the valve 26. This results in valve 24 being moved to the first operating position as illustrated in FIG. 6 and valve 26 being moved to the aforementioned third operating position. With the valves 24 and 26 so positioned the pressurized fluid discharge of the pump 12 is directed through the conduit 60, fluid chamber 56, conduit 82, fluid chamber 74, conduit 102, motor inlet port 96, into the motor 20. The motor discharge is returned to the pump 12 through the motor outlet port 100, conduit 108, fluid chamber 78, conduit 86, fluid chamber 58, and the conduit 62. Thus the fluid motor is placed in communication with the pressurized output of the pump 12 and the output shaft 116 of the motor 20 rotatably drives the member 114. However the shaft 73 of the valve 26 has been moved to the right by the energized solenoid 138 taking member 114 out of abutting engagement with the shaft 73. Consequently during the slew mode of operation the positioning of the valve 26 is unaffected by the rotatable movement of the member 114.

Means 132, as in the initial embodiment, is provided for counting the number of steps performed by the system during the slew mode of operation and as in the initial embodiment, when means 132 has counted a number equal to the number of steps called for at the outset of the slew command, the slew solenoid 138 will be deenergized. Consequently the valve 26 under the urging of the return spring 118 will move to the left to the first operating position while the valve 24 remains at the first position thereby establishing the first bypass path through the conduit 90. Thus the motor 20 is no longer in communication with the pump 12.

Figure 7:
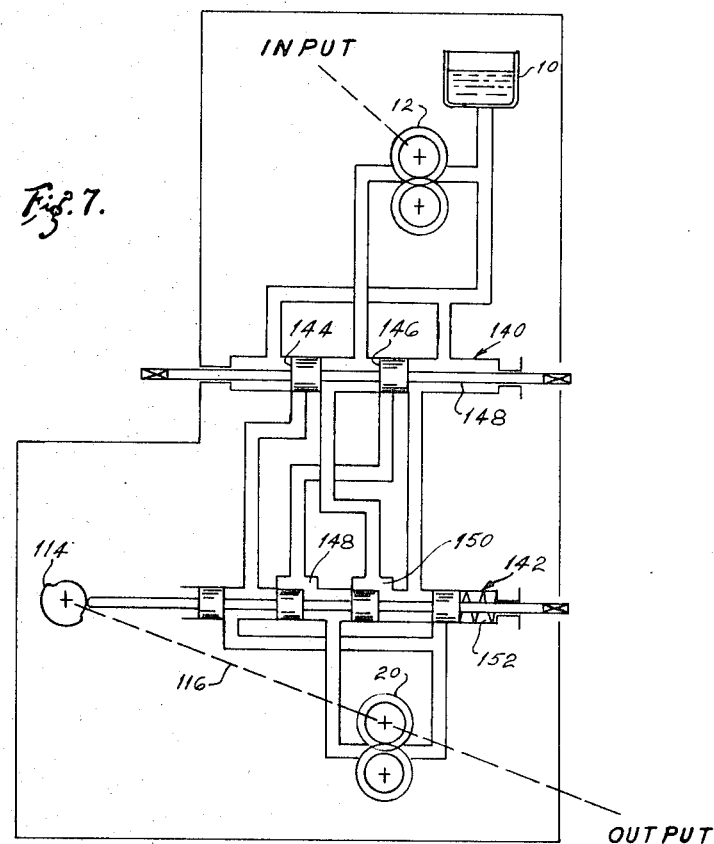
FIG. 7 is a diagrammatic illustration of a third embodiment wherein the second embodiment has been modified, the modification consisting of varying the construction of the means for regulating fluid flow through such apparatus and of adapting the interconnecting fluid flow paths so as to retain all operational capabilities of the second embodiment.

Various other modifications to the form of the present invention without departure of the essential characteristics thereof are possible. With particular reference to FIG. 7, a further embodiment of the invention is illustrated which differs from the second embodiment of FIG. 6 in the number of lands provided at the stepping valve 140 and at the feedback valve 142. Valve 140 of FIG. 7 utilizes only two spaced lands 144 and 142 fixedly mounted on a common shaft 148 as opposed to the use of three lands 48, 50, and 52 by the valve 24 in FIG. 6. Valve 142 of FIG. 7 likewise utilizes one less land than the corresponding valve 26 of FIG. 6. Other differences between the two embodiments relates to modifications of the interconnecting conduit means and a widening of the openings 148 and 150 into the bore 152 to accommodate the above changes in the number of lands per valve in order to retain the first and second bypass path, and the first and second sets of separate and independent fluid flow paths. It is obvious that the same result may be achieved by other arrangements of the control apparatus herein shown and described.

Figure 8:
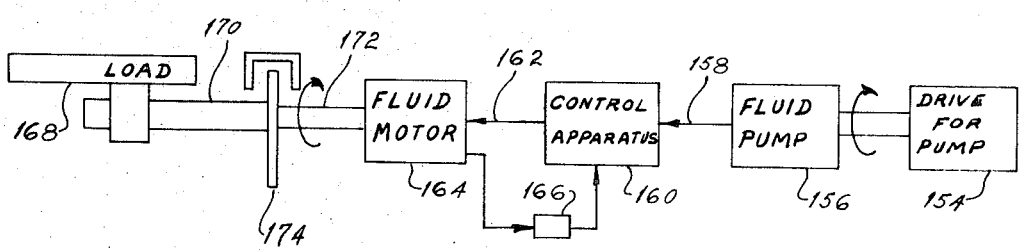
FIG. 8 is a diagrammatic view illustrating an application of control apparatus to a numerical control for a machine tool control system.

One of the major advantages of the present invention is that is readily adaptable to both a low accuracy, high speed application and a high precision, high speed application such as in a numerical control machine tool system with minimum modification. With particular reference to FIG. 8 there is illustrated a block diagram of a typical application of hydraulic drive control apparatus as it would be adapted for use and inserted within a numerical control for a machine tool such as a grinder, a mill, a lathe, a boring machine or the like.

The control comprises an electric motor 154 for driving a hydraulic pump 156, the latter providing a source of pressurized fluid which passes through an interconnecting conduit 158 to the control apparatus 160 which regulates flow through the flow paths 162 to a hydraulic motor 164. Cam member 166 is interposed between the control apparatus 160 and the motor 164 to provide for the feedback function as earlier disclosed.

Interposed between the hydraulic motor 164 and the load 168 driven thereby is a lead screw 170 of a predetermined pitch which is connected directly to both the output shaft 172 of the motor 164 and the load 168. The lead screw functions to position the load which is illustrated as a rotary or indexing table. Counting means 174 is provided for counting the number of steps performed by the system while in the slew mode of operation. To this extend the system is substantially identical to the previous embodiments of the apparatus.

We claim:

1. Control apparatus having a plurality of fluid flow paths disposed in series relationship relative to each other;
means for controlling fluid flow through said flow paths;
structure for operating said means; and
said structure being effective:
   to interconnect said flow paths to define a first bypass path to enable continuous fluid flow therethrough;
   to disconnect said first bypass path and to establish a first set of separate and independent flow paths through said apparatus;
   to interrupt said first set of flow paths and to reconnect said flow paths through a second bypass path to enable continuous fluid flow therethrough;
   to disconnect said second bypass path and to establish a second set of separate and independent flow paths through said apparatus; and
   to reestablish a said first bypass path while interrupting fluid flow through said second set of flow paths.

2. The apparatus as set forth in claim 1 wherein;
said means comprises a plurality of elements, each of which is movable between a plurality of positions by said structure;
first and second ones of said elements being effective when disposed in a first position to interconnect the plurality of flow paths to define said first bypass path;
said first one of the elements being movable to a second position while said second one of the elements remains at the first position to interrupt said first bypass path and to establish said first set of separate and independent flow paths;

said second one of the elements being movable to a second position while said first one of the elements remains at the second position to interrupt said first set of flow paths and to reconnect said flow paths to establish said second bypass path;

said first one of the elements being movable to the first position while said second one of the elements remains at the second position to disconnect said second bypass path and to establish said second set of separate and independent flow paths; and said second one of the elements being movable to the first position while said first one of the elements remains at the first position to interrupt fluid flow through said second set of flow paths and to reestablish said first bypass path.

3. The apparatus as set forth in claim 2 wherein:
said first one of the elements comprises a spool valve; and
said structure effective to operate said first element comprises a plurality of solenoids.

4. The apparatus as set forth in claim 2 wherein:
said second one of the elements and the structure for operating same comprises a spring return spool valve actuated by a rotatively driven member.

5. The apparatus as set forth in claim 2 wherein:
said plurality of elements each comprises a spool valve.

6. The apparatus as set forth in claim 2 wherein:
said structure for operating the plurality of elements comprises at least one solenoid.

7. The apparatus as set forth in claim 2 wherein:
said structure for operating the plurality of elements comprises at least one rotatably driven member.

8. The apparatus as set forth in claim 2 wherein:
said first and second elements are spool valves; and
said structure for operating said first element is a plurality of solenoids; and
said structure for operating said second element is a rotatably driven member.

9. The apparatus as set forth in claim 2 wherein:
said second one of the elements is further movable to a third position while said first one of the elements is positioned at the first position to establish said second set of separate and independent flow paths.

10. The apparatus as set forth in claim 1 together with at least one additional fluid flow path defining an additional set of separate and individual flow paths through a said apparatus:
additional means for controlling fluid flow through the additional set of flow paths; and
additional structure for operating said means:
to prevent fluid flow through said additional set of flow paths and to allow fluid flow through said additional means to said plurality of flow paths; and
to allow fluid flow through said additional set of flow paths while preventing fluid flow to said plurality of flow paths.

11. The apparatus as set forth in claim 10 wherein:
said additional means for controlling fluid flow comprises:
a third element movable between a plurality of positions by said additional structure;
said third element being effective when disposed in a first position to prevent fluid flow through said additional set of flow paths and to allow fluid flow through said element to said plurality of flow paths; and effective when moved to a second position to allow fluid flow through said additional set of flow paths while preventing fluid flow to said plurality of flow paths.

12. The apparatus as set forth in claim 10 wherein:
said third element comprises a spool valve; and
said additional structure for operating said third element comprises:
a solenoid to move said third element from the first position to the second position thereof; and
a return spring to move said third element from the second position to the first position.

13. A control apparatus comprising:
first means movable between a plurality of positions;
second means movable between a plurality of positions;
third means movable between a plurality of positions;
fluid connections between said first, second, and third means interconnecting said means and defining therebetween a plurality of fluid flow paths in series relationship relative to each other;
structure for moving said first, second, and third means between the respective plurality of positions;
said first, second, and third means when disposed in a first position establishing a first bypass path with said structure effective:
to move said first means to a second position while said second means and said third means remain respectively at the first position thereof to establish the fluid flow paths into a first set of separate and independent flow paths and to interrupt said first bypass path;
to move said second means to a second position while said first means is at the second position and said third means is at the first position to interrupt a said first set of flow paths and to establish a second bypass path,
to move said first means to the first position while said second means is at the second position and said third means is at the first position to establish the flow paths into a second set of separate and independent flow paths and to interrupt said second bypass path;
to move said second means to the first position while said first and said third means are at the first position to reestablish said first bypass path and to interrupt said second set of separate and independent flow paths;
to move said third means to the second position to bypass said first and said second means and to establish a third set of separate and independent flow paths; and
to return said third means to the first position thereby interrupting said third set of flow paths and reestablishing fluid communication between said first, second and third means.

14. The apparatus as set forth in claim 13 wherein said first means comprises:
a spool valve; and
said structure for operating said first means comprises:
a plurality of solenoids.

15. The apparatus as set forth in claim 13 wherein said second means and the structure for operating same comprises:
a spring return spool valve actuated by a rotatably driven member in abutting engagement with said valve.

16. The apparatus as set forth in claim 15 wherein said member comprises a cam.

17. The apparatus as set forth in claim 13 wherein:
said third means comprises a spring return spool valve; and
said structure for operating the third means comprises at least one solenoid.